United States Patent [19]

Hishinuma et al.

[11] Patent Number: 4,609,815

[45] Date of Patent: Sep. 2, 1986

[54] PAPER HOLE DETECTING APPARATUS WITH SLIDABLE REFLECTOR

[75] Inventors: Hiroshi Hishinuma; Masao Miyasaka; Kenji Okada; Shuichi Morio, all of Ibaraki, Japan

[73] Assignee: Hitachi Koki Company, Limited, Tokyo, Japan

[21] Appl. No.: 471,610

[22] Filed: Mar. 3, 1983

[30] Foreign Application Priority Data

Mar. 5, 1982 [JP] Japan .................................. 57-35427

[51] Int. Cl.⁴ ................................................ G01V 9/04
[52] U.S. Cl. .................................................. 250/222.1
[58] Field of Search ........... 250/548, 557, 561, 223 R, 250/222.1, 569, 559; 356/430, 237, 239; 235/458

[56] References Cited

U.S. PATENT DOCUMENTS

| | | | |
|---|---|---|---|
| 3,041,462 | 6/1962 | Ogle | 235/458 |
| 3,163,746 | 7/1959 | Hoeser | 235/458 |
| 3,932,755 | 1/1976 | Sagawa | 250/559 |
| 4,295,040 | 9/1981 | Berthier | 235/458 |
| 4,296,332 | 9/1981 | Hill | 250/570 |

*Primary Examiner*—David C. Nelms
*Assistant Examiner*—James G. Gatto
*Attorney, Agent, or Firm*—Sughrue, Mion, Zinn, Macpeak, and Seas

[57] ABSTRACT

An apparatus for detecting a feeding of paper has a reflector which is mounted on a bottom of a switch lever. The switch lever, in turn, is slidably mounted on black paper retainer plate which has poor reflecting properties, and a light emitting element emits light which is reflected by the paper towards a light receiving element. When paper which has good reflecting properties is being fed, the reflector is slid so that it is no longer located opposite the light emitting element, and any light passing through holes in the paper is thus poorly reflected by the black paper retainer plate, thereby enabling the light receiving element to readily detect the presence or absence of a hole in the paper. However, when the paper being fed has poor reflecting properties, the reflector is slid so that it is located opposite the light emitting element, and any light passing through one of the holes in the paper is strongly reflected by the reflector. Therefore, again, the light receiving element can readily detect the presence or absence of the holes.

7 Claims, 7 Drawing Figures

PAPER HOLE DETECTING APPARATUS WITH SLIDABLE REFLECTOR

BACKGROUND OF THE INVENTION

1. Field of the Invention

The present invention relates to an apparatus for detecting the feeding of paper in which holes, which are provided along longitudinal margins at both sides of the paper, are optically detected in order to monitor how the paper is fed.

2. Description of the Prior Art

Referring to FIG. 1, in accordance with a conventional apparatus for detecting paper feeding, light from a light emitting element 3, such as a light emitting diode, collides against a paper 1 when the paper 1 is located above the light emitting element 3 so that a strong reflected light arrives at a light receiving element 4, such as a photo-transistor or the like. When a hole 2 in the paper is brought into alignment with the light emitting element 3 as shown in FIG. 2, the light from the light emitting element 3 passes through the hole 2 and collides against a non-reflecting, black paper retainer plate 5 which is rotatably mounted on a support of a paper feeding tractor (not shown). Accordingly, a weak, irregular reflected light arrives at the light receiving element 4.

In FIGS. 1 and 2, the solid arrow line denotes a strong light, while the chained arrow line denotes a weak light. The light receiving element 4 determines whether the reflected light is strong or weak in order to monitor how the paper is being fed. However, if a colored paper 8 which does not have a large reflection factor is being fed, the light reflected from the colored paper 8 is weak and has an intensity which is almost the same as the irregular light reflected from the paper retainer plate 5. Accordingly, it is difficult and sometimes impossible for the light receiving element 4 to sense whether the light has been reflected from the paper 8 or from the paper retainer plate 5. In other words, it thus becomes impossible to detect the holes 2, and the feeding of the paper is sometimes erroneously detected as being abnormal, in spite of the fact that the paper is being fed normally.

SUMMARY OF THE INVENTION

The object of the present invention is to remove the above-mentioned drawbacks and provide an apparatus for reliably detecting the feeding of paper, regardless of the color of the paper.

In accordance with the present invention, if the reflection factor of the paper is not good, and there is little or no difference in the intensity of light reflected by the paper and the paper retainer plate, a reflector is slidably displaced behind the paper and opposite to the light emitting element so that strong intensity light is reflected toward the light receiving element when a hole in the paper is disposed between the light emitting element and the light receiving element.

DESCRIPTION OF THE PREFERRED EMBODIMENT

Figure 1:
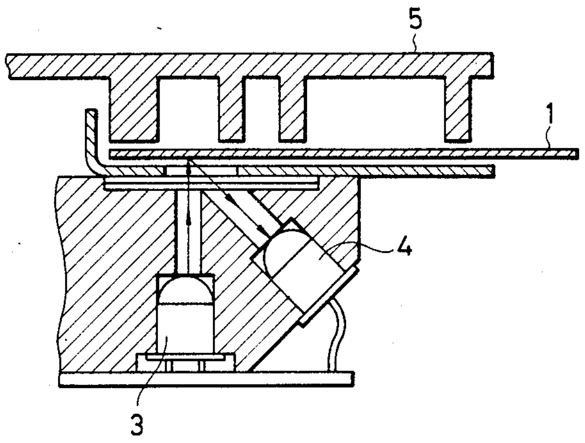
FIG. 1 PRIOR ART
FIGS. 1 and 2 are vertical, cross-sectional views showing one example of a conventional apparatus for detecting the feeding of paper.
Figure 2:
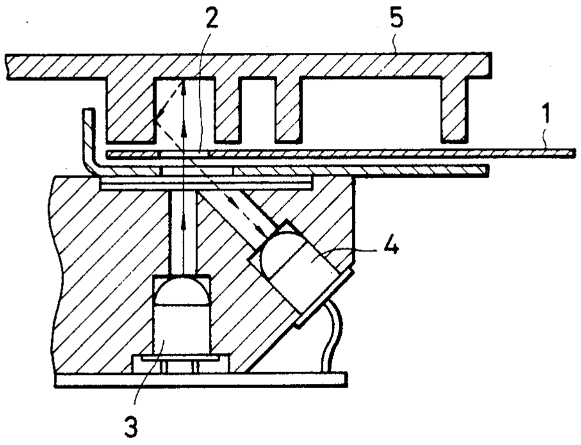
FIG. 2 PRIOR ART
Figure 3:
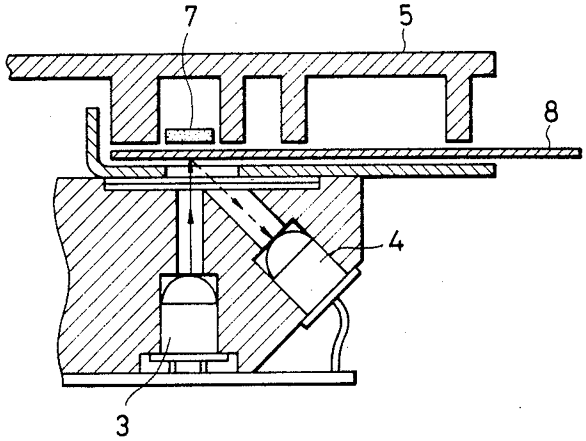
FIGS. 3 and 4 are vertical, cross-sectional views for explaining the principle of the apparatus of the present invention for detecting the feeding of paper.
Figure 4:
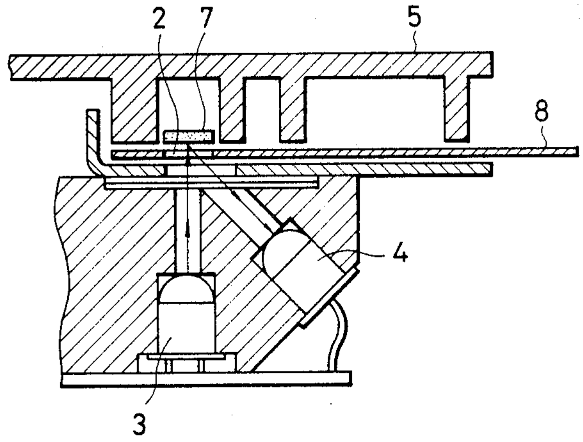

As shown in FIGS. 3 and 4, if a colored paper 8 which has a low reflection factor is being fed, a reflector 7 which has a high reflection factor is disposed behind the colored paper 8 so that it is located opposite the light emitting element 3. If the colored paper 8 is being fed, and light from the light emitting element 3 contacts the colored paper 8, as shown in FIG. 3, a weak intensity light is reflected by the colored paper 8 towards the light receiving element 4. If a hole 2 in the paper is opposite the light emitting element 3, as shown in FIG. 4, the light from the light emitting element 3 is strongly reflected by the reflector 7 so that a strong reflected light arrives at the light receiving element 4. As a result, it is possible to detect the hole 2 reliably, even if a colored paper 8 is being fed.

Figure 5:
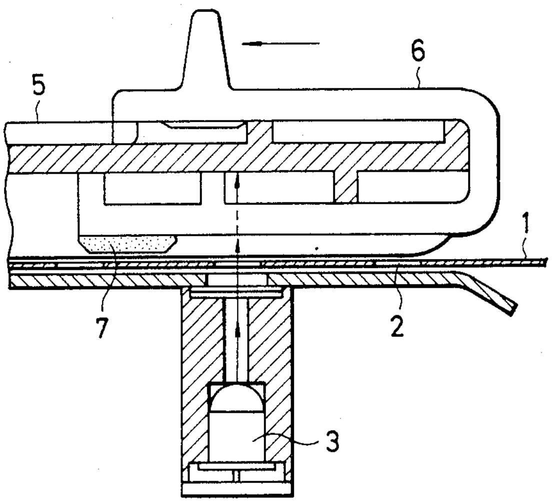
FIGS. 5 and 6A are vertical, cross-sectional views showing one embodiment of the apparatus of the present invention for detecting the feeding of paper
Figure 6A:
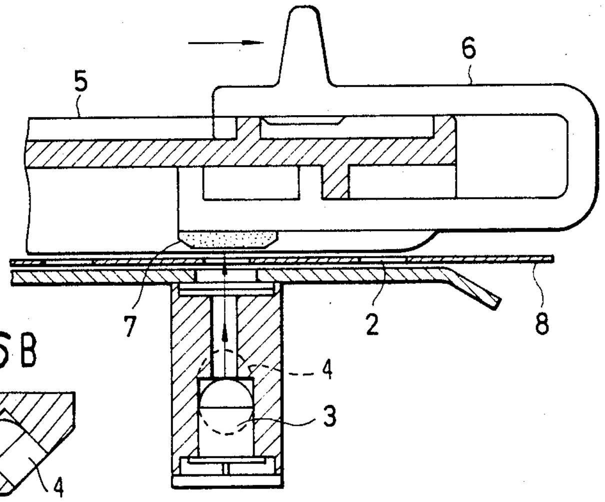
Figure 6B:
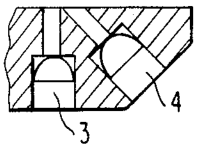
FIG. 6B is a partial cutaway view illustrating the positions of the light emitting element 3 and the light receiving element 4.

FIGS. 5 and 6 show one embodiment of the detecting apparatus constructed in accordance with the present invention. The above-mentioned reflector 7 is mounted to and integral with a bottom of a switch lever 6, and the switch lever 6 is arranged on a paper retainer plate 5 and slides by a simple operation of the lever. If a paper 1 which has good reflection properties is being fed, the reflector 7 is moved by the switch lever 6 to a position which is offset from the light emitting element 3 so that the light which passes through the hole 2 is not affected by the reflector 7, as shown in FIG. 5. If a colored paper 8 which has poor reflecting properties is being fed, the reflector 7 is moved to a position at which the reflector 7 counterfaces the light emitting element 3 so that the light which passes through the hole 2 is reflected by the reflector 7 toward the light receiving element 4, as shown in FIGS. 6A and 6B. The above-mentioned switch lever 6 also serves as a detent to fix its position by utilizing a projection of the paper retainer plate 5. Thus, the lever 6 is always accurately positioned in either a reflecting or non-reflecting position, as described above.

In accordance with the present invention, by merely supplementing simple parts in the conventional apparatus so that a simple switching operation is incorporated within it, papers of any kind can be reliably detected. Accordingly, the cost of the apparatus of the present invention is low.

We claim:

1. An apparatus for detecting a feeding of a paper (1, 8) having holes (2) along longitudinal margins thereof, comprising:
- a light emitting element (3);
- a light receiving element (4);
- a non-reflecting element (5) located on a side of said paper opposite said light emitting element;
- a reflector;
- means for slidably mounting said reflector on said non-reflecting element;
- such that light emitted from said light emitting element which passes through one of said holes being substantially reflected toward said light receiving element by said reflector when said reflector is slid to a position which is opposite said light emitting element, said light being substantially not reflected toward said light receiving element by said non-reflecting element when said reflector is slid away from said position.

2. The apparatus as claimed in claim 1 wherein said slidable mounting means comprises a switch lever, said reflector being mounted on a bottom of said switch lever, and said switch lever being slidably mounted on said non-reflecting element.

3. The apparatus as claimed in claim 1 wherein said non-reflecting element comprises a paper retainer plate (5).

4. The apparatus as claimed in claim 2 wherein said non-reflecting element comprises a paper retainer plate (5).

5. The apparatus as claimed in claim 1 wherein said reflector is positioned opposite to said light emitting element when a reflection factor of said paper is insufficient.

6. The apparatus as claimed in claim 1 wherein said reflector is located away from said position which is opposite to said light receiving element when a reflection factor of said paper is sufficient.

7. The apparatus as claimed in claim 1 wherein said light receiving element senses light reflected from said paper and from said non-reflecting element and said reflector to detect a presence or absence of one of said holes.

* * * * *